Jan. 2, 1923. Re. 15,513
M. O. CLAUSS.
SKEIN HOLDER.
ORIGINAL FILED DEC. 27, 1921.
Fig. 1.
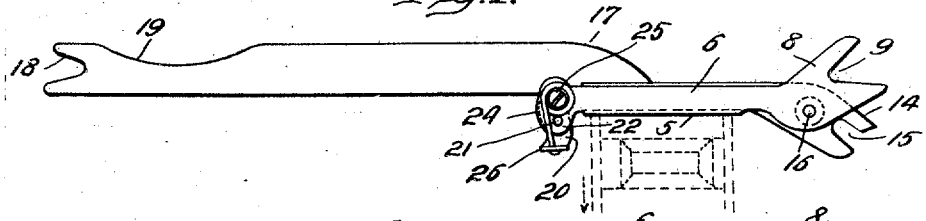
Fig. 2.
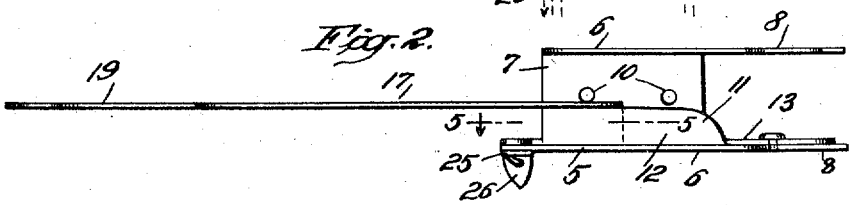
Fig. 3.
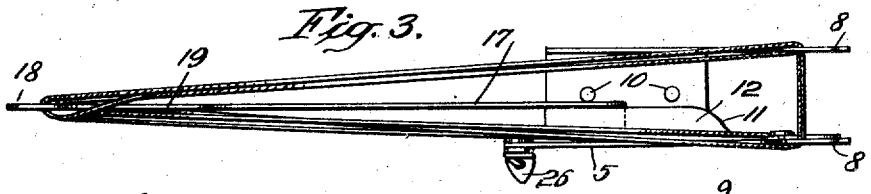
Fig. 4.
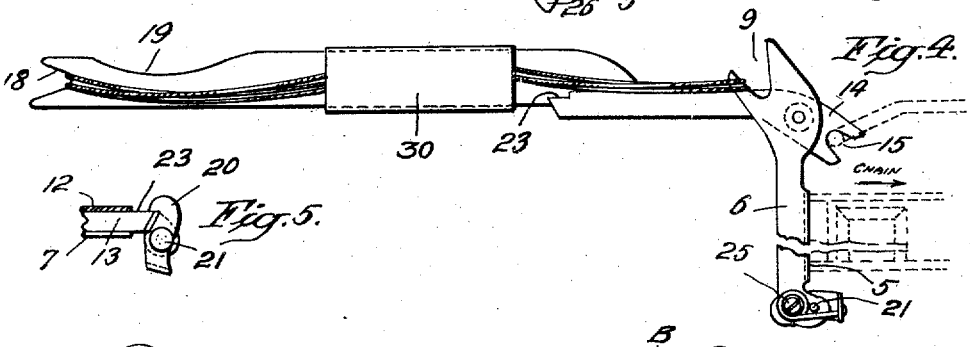
Fig. 5.
Fig. 8.
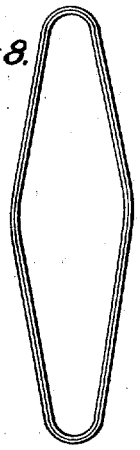
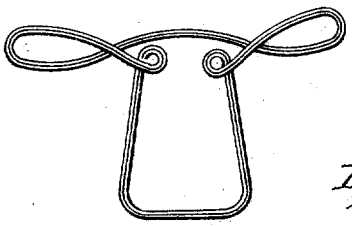
Fig. 7.
Fig. 6.
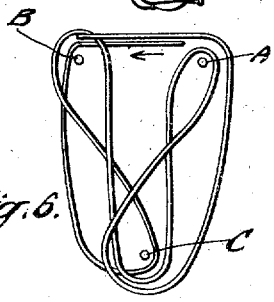
Inventor
May Otto Clauss
By his Attorney Archibald Cox Reissued Jan. 2, 1923. Re. 15,513

UNITED STATES PATENT OFFICE.

MAX OTTO CLAUSS, OF NEW YORK, N. Y., ASSIGNOR TO THE CLARK THREAD COMPANY, OF NEWARK, NEW JERSEY, A CORPORATION OF NEW JERSEY.

SKEIN HOLDER.

Original application filed August 1, 1919, Serial No. 314,647. Divided and this application filed December 23, 1919, Serial No. 346,837. Original No. 1,401,518, dated December 27, 1921. Application for reissue filed November 13, 1922. Serial No. 600,695.

*To all whom it may concern:*

Be it known that I, MAX OTTO CLAUSS, a citizen of the United States, and a resident of New York, in the county of New York, State of New York, have invented certain new and useful Improvements in Skein Holders, of which the following is a specification.

This invention relates to skein holders for skeining machines and constitutes a division of my prior application filed August 1, 1919, Serial No. 314,647.

It is the primary object of the present invention to provide a simple, inexpensive and reliable holder for the windings of a skeining machine whereby the thread as it is formed into a multiplicity of superposed loops in the manner referred to in my prior application, will be securely held under tension, so that the thread strands will not become entangled. I thus entirely eliminate the raveling or twisting of the thread upon itself. The normal tendency of textile threads and particularly coarse cotton thread to twist upon itself when it is not under tension, is well-known, and it is the aim and purpose of this invention to provide a holder for the skein strands which, particularly when used in connection with my improved method of winding the thread into skein loops, will entirely eliminate this very undesirable and sometimes ruinous condition.

In producing a skein holder for the above purpose, in the preferred embodiment of my invention, I provide two relatively movable loop receiving and holding parts which in their normal relative positions will maintain the thread strands under a certain tension as the thread is wound thereon so that when the several superposed series of thread loops constituting a completed skein are opened out into a single loop consisting of a multiplicity of thread strands, the strands will lie perfectly straight without twisting or kinking.

It is a further object of my invention to provide an improved skein holder upon which the thread is wound to form a skein in the manner disclosed in my application above identified, and which is so constructed that, while the skein is still upon the holder, a tubular band or label may be readily applied to the several skein loops by an attendant or operative, said holder being equipped with a suitable latch means to releasably hold the relatively movable parts in normal position and permit of the easy and quick removal of the completed skein from the holder.

With the above and other objects in view, the invention consists in the improved skein holder as above characterized and in the form, construction, and relative arrangement of its several parts as will be hereinafter more fully described, illustrated in the accompanying drawings, and defined in the subjoined claims.

In the drawing, wherein similar reference characters designate corresponding parts throughout the several views and in which I have illustrated one practical embodiment of the improved skein holder, Figure 1 is a side elevation showing the holder in position for the thread to be wound thereon.

Fig. 2 is a top plan view.

Fig. 3 is a similar view showing the thread wound upon the holder.

Fig. 4 is a side elevation illustrating the relative position of the parts of the holder when the skein is to be removed.

Fig. 5 is a detail sectional view taken on the line 5—5 of Fig. 2.

Fig. 6 is a diagrammatic view illustrating the method of looping or winding the thread upon the holder to form the skein.

Fig. 7 is a similar view showing an intermediate point in the separation of the skein loops.

Fig. 8 is a diagrammatic view showing the superposed loops completely separated to form a single loop.

Referring in detail to the drawing, 5 designates the body of the skein holder, which, as shown, is of channel form in cross section and includes the side flanges 6 integrally connected by the body plate 7. The flanges 6 extend beyond one end of the plate 7 and terminate in the angularly disposed arms 8 which are recessed or bifurcated as at 9. The plate 7 is provided with spaced openings 10 to receive suitable fastening elements whereby the holder may be securely fixed upon one of the links of an endless chain or other carrier of a skein winding machine.

The skein holding member 11 consists of a plate 12 having an angularly bent flange 13 extending along one of its longitudinal edges. This flange, at one end of the plate 12, is formed with an angularly disposed arm 14 which is bifurcated or recessed as at 15. The flange 13 is arranged closely adjacent to the inner face of one of the side flanges 6 on the body member 5 and the arm 14 is pivoted as at 16 to the arm 8 on the flange 6. It will be observed that the bifurcation 15 of the arm 14 is not obstructed by the arm 8 but projects beyond the edge of the latter arm.

A loop forming element 17 is fixed to the other end of the plate 12 and is disposed at the inner edge thereof and in a plane at right angles to the plane of said plate. This element may be of any desired length, but as indicated in the drawing, is preferably about twice the length of the body member 5. This element 17 at its free end is notched or bifurcated as shown at 18 and adjacent to said notch a longitudinally extending cavity or recess 19 is formed in one edge of said element for a purpose which will be hereinafter explained.

The body member 5 and the loop forming element 17 are normally held against relative pivotal movement by means of a latch dog 20 which is pivoted as at 21 upon an angular extension 22 formed on one of the flanges 6 of the body member. This dog is adapted to engage a shoulder 23 formed on the end of the flange 13 and is yieldingly held in such engagement by means of a spring 24, one end of which is fixed to the flange 6 by the screw 25, while its other end is engaged with the angularly disposed lug 26 formed on the latch dog 20.

In practice, a plurality of the skein holding devices, as above described, are mounted upon the links of an endless chain in spaced relation to each other, which constitutes a part of a skein winding mechanism. An intermittent movement is transmitted to this chain and the skein holding devices are successively brought to a substantially horizontal position at the upper end of the vertically disposed chain as seen in Fig. 1 of the drawing. The thread is carried and looped upon the parts of the holding devices by means of a suitably actuated flier, but in so far as the subject matter of the present application is concerned, the winding operation may be performed by hand. I have diagrammatically illustrated a method of winding the skein in Fig. 6 of the drawing, to which reference may now be had. In this figure A and B respectively indicate the spaced bifurcated arms 8 of the skein holder, while C indicates the bifurcation or notch 18 in the end of the element 17.

The method of winding the thread to form a skein is fully disclosed in my original application and as this method constitutes no part of the present invention, it will not be herein described in detail. The winding evolutions constituting a complete cycle of operation are illustrated in Fig. 6 of the drawing, while Figs. 7 and 8 show successive stages of the skein as the several loops thereof are separated or opened out for use. These figures correspond with the same figures in my prior application to which reference may be had for a fuller understanding of the method of winding.

The winding operation is continued until the desired length of thread has been wound upon the holder into a skein in which a series of separate and distinct loops are formed with the loops arranged in superposed relation. It will, of course, be understood that the number of supporting points of the skein loops may be multiplied to form as great a number of loops in the skein as may be desired.

After the skein has been wound upon the holder, in the next intermittent movement of the chain or carrier the holder with the skein thereon will be positioned at one side of the upper sprocket wheel. While in this position the attendant or operative may now easily slip a tubular paper 30 over the end of the element 17 and over the loop strands to approximately the position indicated in Fig. 4 of the drawing. In the continued intermittent movements of the chain, the holder is finally brought to a position where the latch dog 20 will be automatically engaged and released from its locking position with relation to the holder 23. At the same time a part is engaged in the notch or bifurcation 15 of the arm 14 and the loop forming member 11 carrying the element 17 is swung laterally and outwardly in a horizontal plane to a position at right angles to its former position with respect to the chain as also seen in Fig. 4 of the drawing. In the movement of the element 17 to the latter position, the tension of the skein loops upon the bifurcated arms 8 is slightly loosened so that the loops may be readily disengaged from said arms in the removal of the skein from the holder, which latter operation may be accomplished either automatically or by hand. There is a natural tendency of the yarn or thread, and particularly of coarse yarns, to twist upon itself when the individual strands of the skein are separated. I have found that holding the series of thread loops under tension in the formation of the skein effectually eliminates this twisting tendency of the thread or yarn so that when the skein loops are separated, the thread will not twist at spaced intervals whereby the possibility of entanglement of the thread strands with each other is obviated. The several superposed series of skein loops may be very easily separated into a single loop, as indicated in Figs. 7 and 8 of the drawings.

From the foregoing description considered in connection with the accompanying drawing, the construction and manner of operation of the improved skein holder will be readily understood. While I have referred to these holders as mounted upon a flexible carrier chain, it is of course apparent that my invention is not to be restricted to this particular manner of mounting the holders, as they might obviously be arranged upon a rotating disk, or any other suitable form of carrier or support. A holder of this construction for the skein loops enables a tubular band or label to be readily slipped over the superposed loops while they are still upon the holder to thereby prevent separation of the individual thread strands. This operation may be carried out in an expeditious manner and without difficulty by merely slipping a band longitudinally over the end of the thin metal blade 17. Thus, when the skein is removed from the holder there is no possibility of the several loop strands becoming separated. While I therefore prefer in practice to construct the holder in the manner herein described, it is nevertheless to be borne in mind that the several detail parts of this holder are likewise susceptible to various mechanical changes, and the device may be exemplified in numerous other constructions without departing from the essential features or sacrificing any of the advantages of my invention as defined within the spirit and scope of the appended claims.

The blade 17 is resiliently movable but normally maintains a sufficient rigid position to hold the thread loops under tension. The paper bands 30 for holding the skein loops in compact relation as shown in Fig. 4, are slipped over the blades 17 of the skein holders and the skein loops thereon with great rapidity, and in so doing, a lateral pressure may be exerted against the blade 17 so that it will be deflected from its normal position. Immediately upon the release of such momentary pressure, the blade will return to such normal position.

I claim:

1. A thread skein holder comprising a plurality of spaced thread engaging parts and a loop supporting part pivotally connected with the thread engaging parts.

2. A thread skein holder comprising a body member having a plurality of spaced thread receiving parts thereon and a loop supporting part pivotally connected with the body member.

3. A thread skein holder comprising a body member having upturned side flanges with thread supporting parts formed thereon, and a loop supporting part pivotally connected with one of the side flanges of the body member.

4. A thread skein holder comprising a plurality of thread supporting parts, means for rigidly connecting the thread supporting parts, an elongated loop supporting part pivotally connected with one of the thread supporting parts, and latch means for holding the thread supporting part and loop supporting part in position to receive the thread.

5. A thread skein holder comprising a body portion consisting of a plate with upturned side flanges, thread receiving parts formed on the forward ends of the side flanges, an elongated loop receiving part pivoted to one of the side flanges, and a latch pivotally connected with one of the side flanges for engaging the loop supporting part to hold it in loop receiving relation with the thread receiving parts.

6. A thread skein holder comprising a body member having a plurality of spaced thread engaging parts, a loop holding element mounted upon said body member for movement relative thereto, and latch means coacting with said element to normally retain the same in its thread loop receiving position with respect to said body member.

7. A thread skein holder comprising a body member having a plurality of spaced thread engaging parts, a loop holding element pivotally mounted upon the body member and having a single thread engaging part, and latch means coacting with said element to normally retain the same in its thread loop receiving position with respect to said body member.

8. A thread skein holder comprising a body member having spaced thread engaging parts, and a thread loop receiving part disposed in a plane intermediate of the planes of said spaced parts and in longitudinally spaced relation thereto.

9. A thread skein holder comprising a body member having spaced thread engaging parts, and a relatively movable thread loop receiving part disposed in a plane intermediate the planes of said spaced parts on the body member and in longitudinally spaced relation thereto to hold the thread loops under tension, said loop receiving part being movable to relieve the tension on the thread loops whereby the skein may be removed from the holder.

10. A thread skein holder comprising a body member having spaced thread engaging parts, a thread loop holding element movably mounted upon the body member and projecting longitudinally therefrom, said element having a thread loop receiving part disposed in a plane intermediate the planes of said spaced parts on the body member and longitudinally spaced therefrom, and latch means to coact with said element and retain the same in its loop receiving position with respect to said body member.

11. A thread skein holder comprising a body member having spaced thread engaging parts, a thread loop holding element pivotally mounted upon said body member for movement relative thereto, said element also having a thread loop receiving part, and a latch dog mounted upon the body member to coact with said element and retain the latter in its loop receiving position with respect to said body member.

12. A thread skein holder comprising a body member having spaced thread engaging parts, a loop holding element pivotally mounted upon one end of the body member and extending longitudinally beyond the other end thereof and terminating in a thread loop receiving part, said extension of the loop holding element consisting of a metal blade over which a skein loop holding hand is adapted to be engaged, and latch means on the body member to coact with said loop holding element and retain the latter in its loop receiving position with respect to said body member.

13. A thread skein holder comprising thread and loop receiving and holding parts including a loop receiving and holding member projecting from the thread receiving parts to enable a skein loop holding band to be engaged around the loops on the loop holding member.

14. A thread skein holder comprising a body member having thread engaging parts, a loop holding element movably mounted upon the body member and having an independently resiliently movable blade terminating at one end in loop receiving means, said blade in its normal position holding the thread loops under tension and adapted to receive a loop holding band inserted longitudinally upon said blade.

15. A thread skein holder comprising parts for receiving and holding superposed loops of thread forming a skein, one of said parts extending as an elongated member to permit a tubular band to be slipped longitudinally onto and surround the skein threads while the skein is on the skein holder.

16. A thread skein holder comprising thread and loop receiving and holding parts, one of said parts receiving and holding one end of a skein consisting of longitudinally extending loops of thread, and the other of said parts receiving and holding the other end of said skein, one of said thread and loop receiving and holding parts extending as an elongated member to permit a tubular band to be slipped longitudinally over the loop threads while the skein is on the holder to prevent them from separating when the skein is removed from the holder.

17. A thread skein holder comprising thread and loop receiving and holding parts, one of which extends as an elongated member to permit a band for enclosing the skein threads to be engaged around the skein threads while the skein is on the holder, said parts being relatively movable to permit the removal of the skein with the band thereon from the holder.

MAX OTTO CLAUSS.